Feb. 2, 1965  W. K. GAUTHIER  3,168,093
ABDOMINAL RETRACTOR DEVICE
Filed Dec. 22, 1961  6 Sheets-Sheet 1
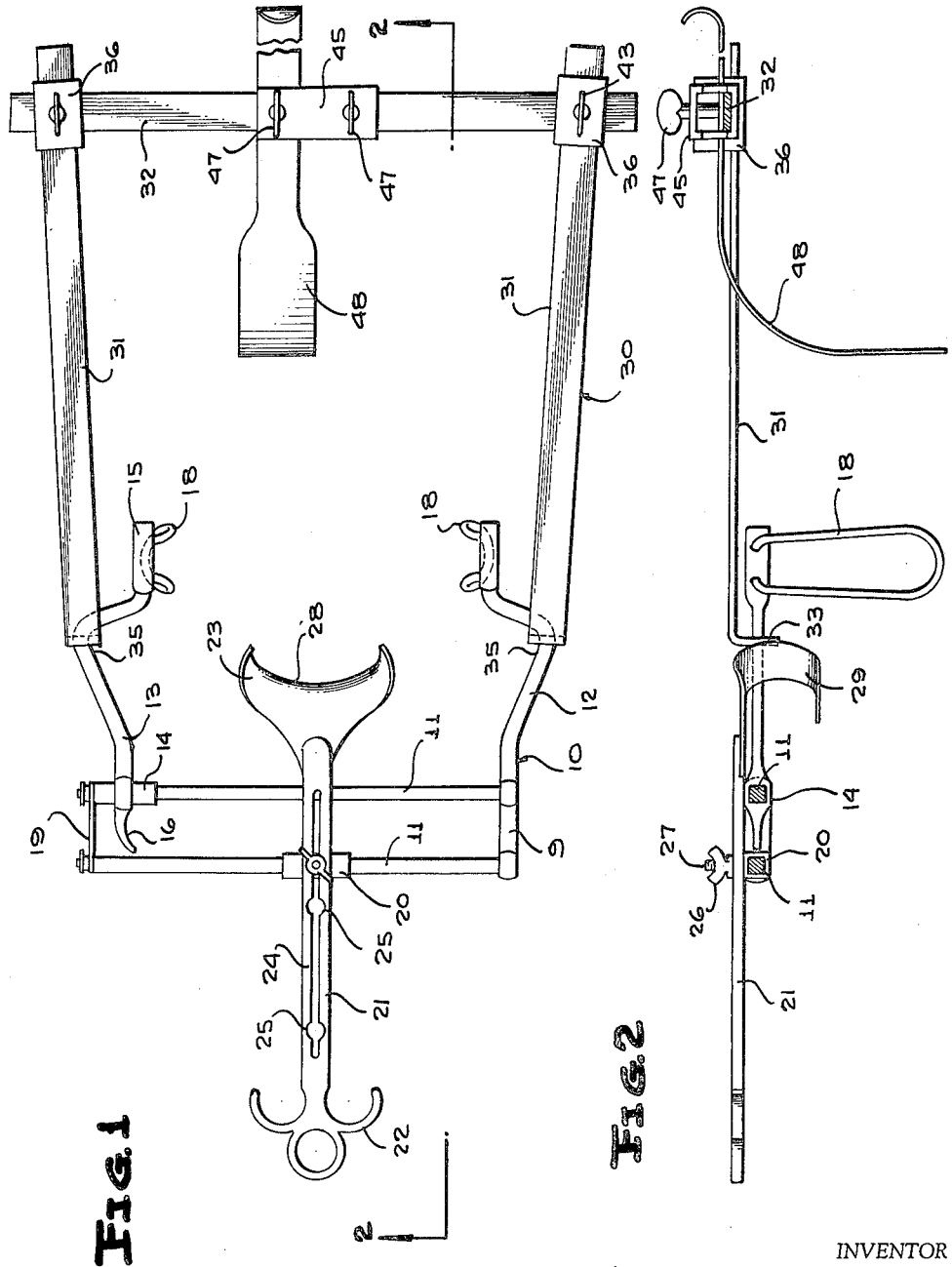
INVENTOR
WILLIAM K. GAUTHIER
BY *Shoemaker and Mattare*
ATTORNEYS

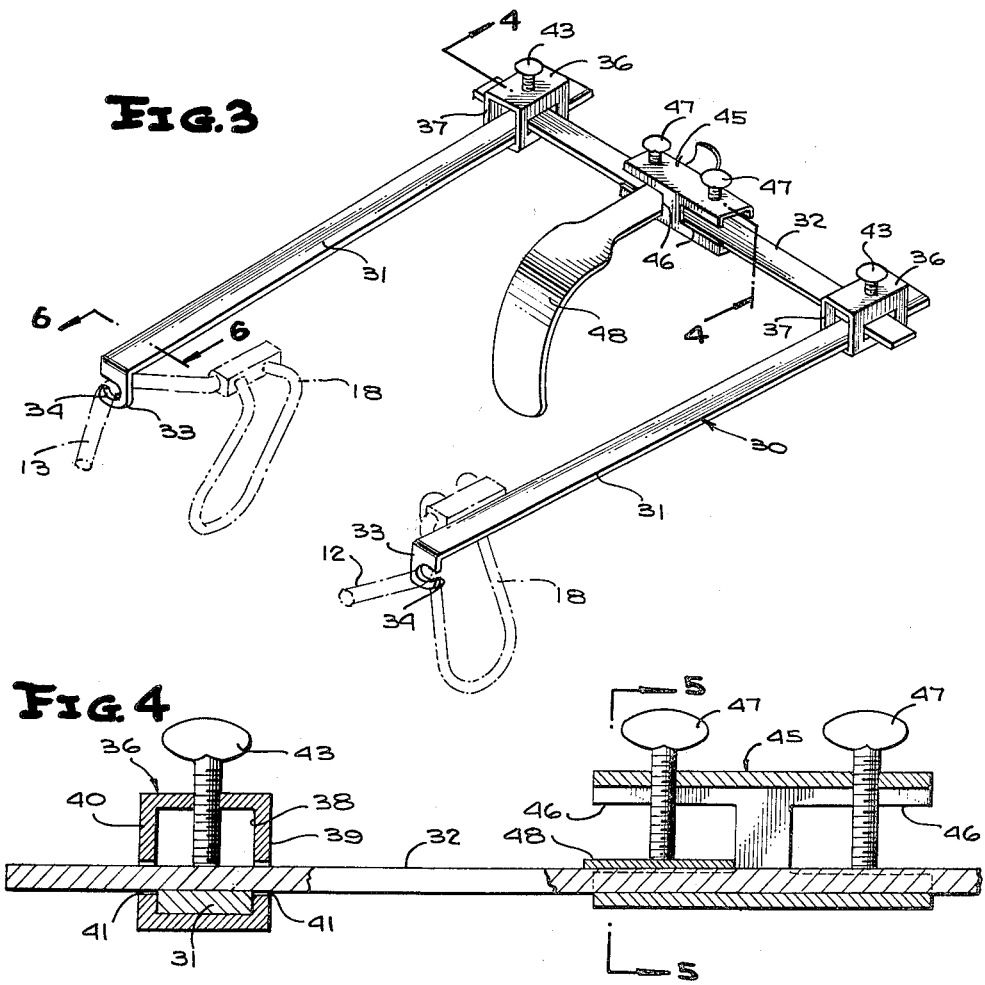
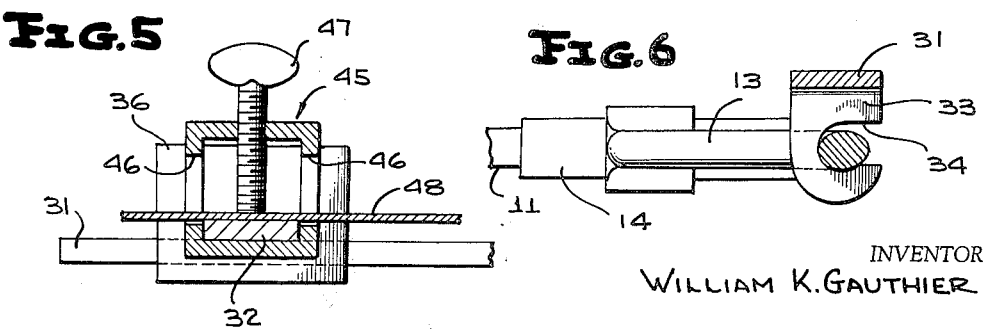

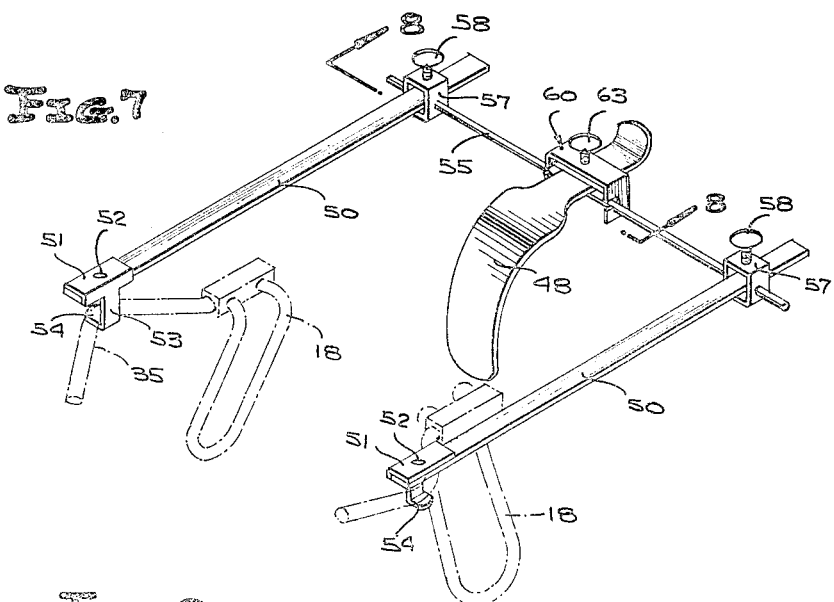
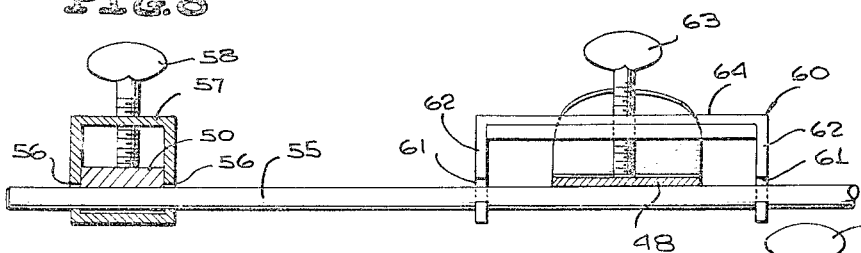
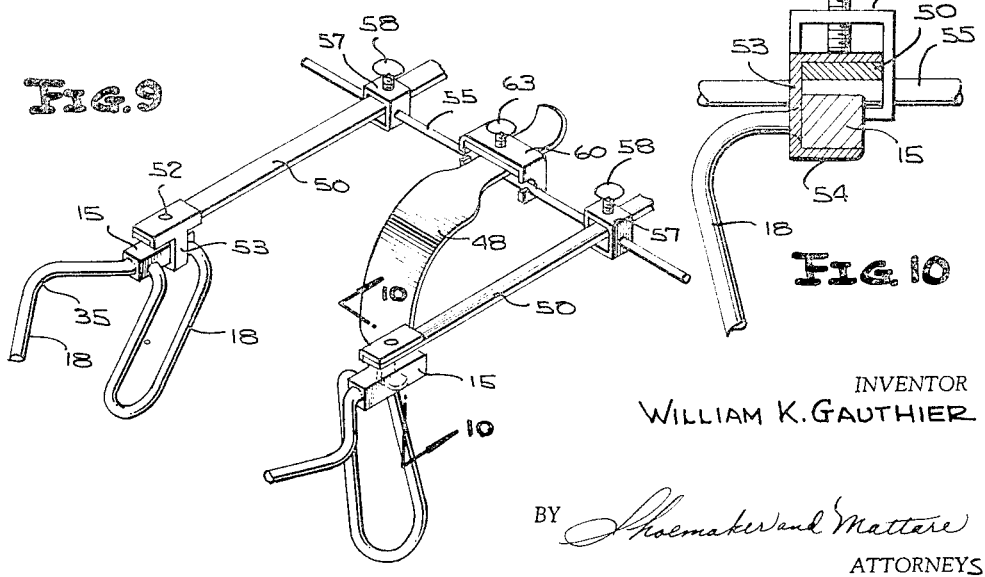

Feb. 2, 1965    W. K. GAUTHIER    3,168,093
ABDOMINAL RETRACTOR DEVICE
Filed Dec. 22, 1961    6 Sheets-Sheet 4
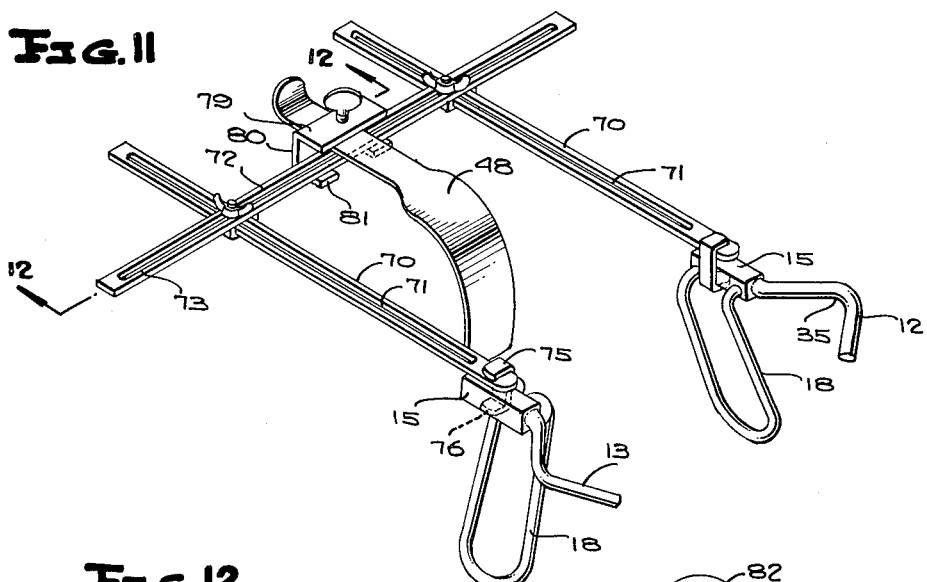
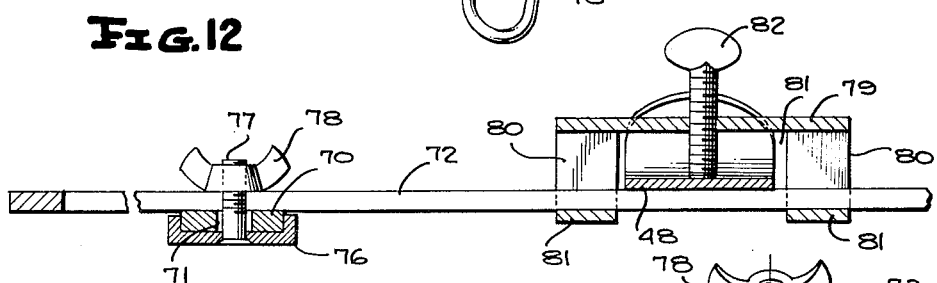
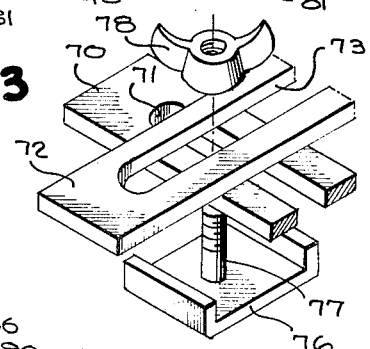
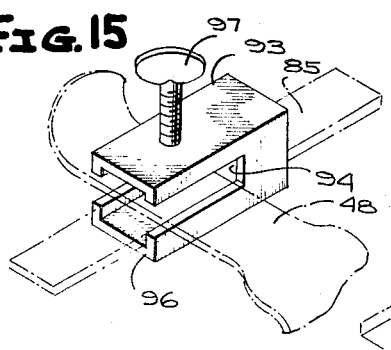
INVENTOR
WILLIAM K. GAUTHIER
BY *Shoemaker and Mattare*
ATTORNEYS

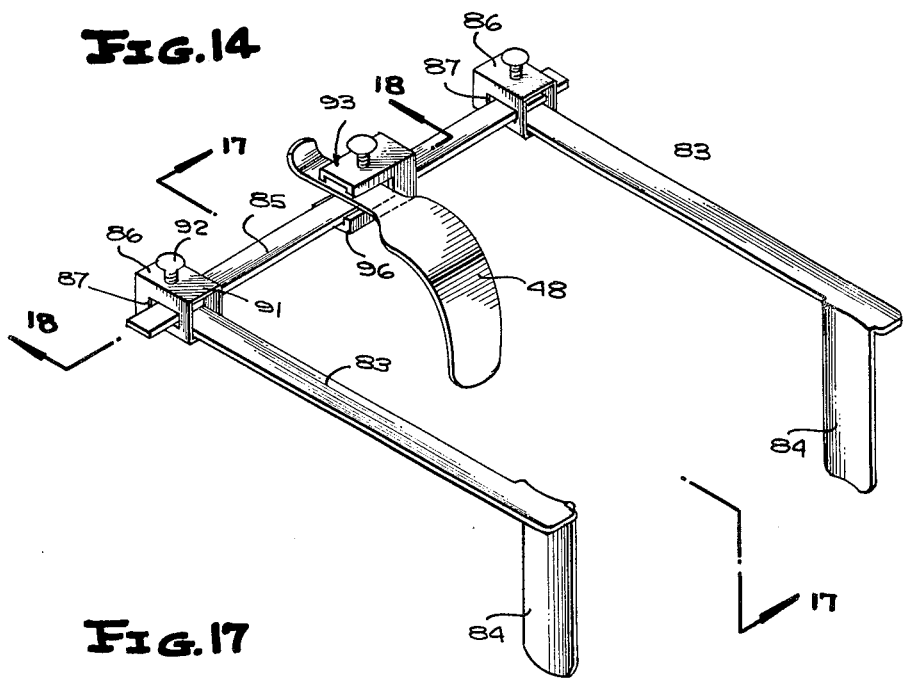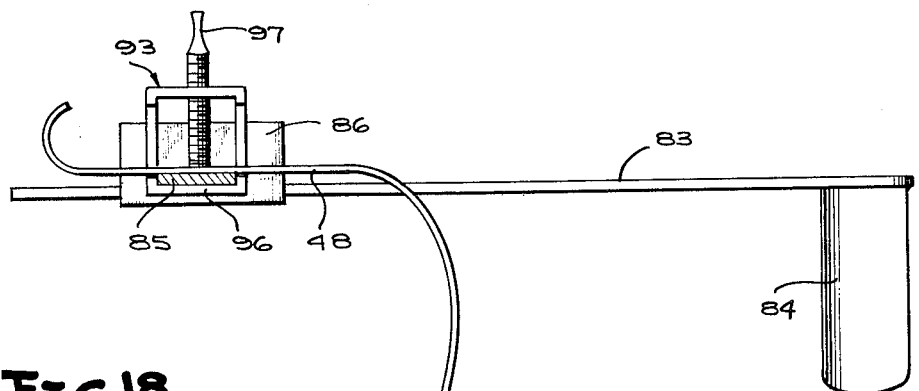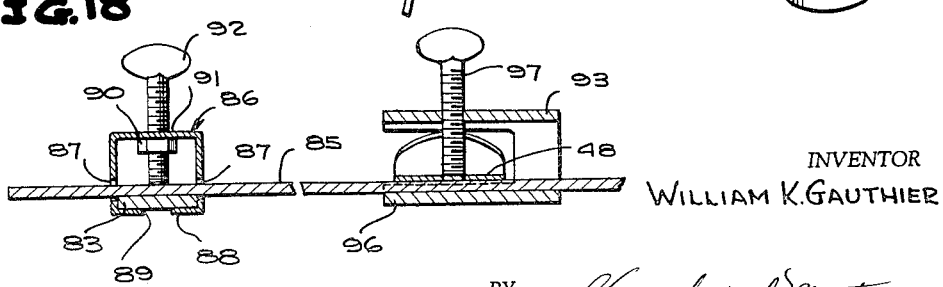

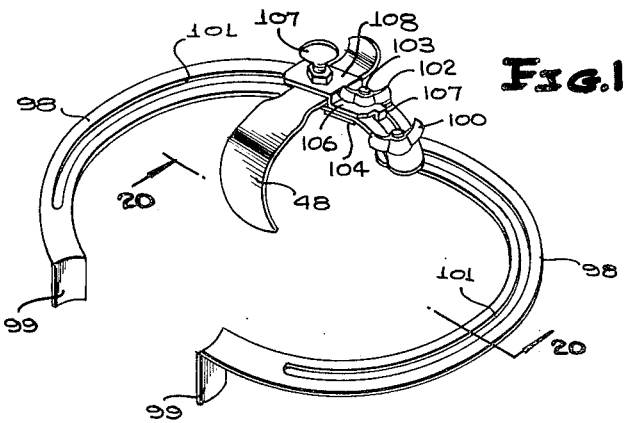
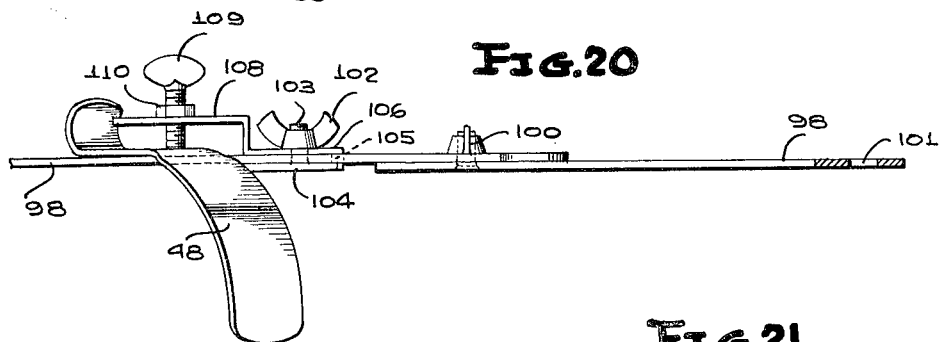
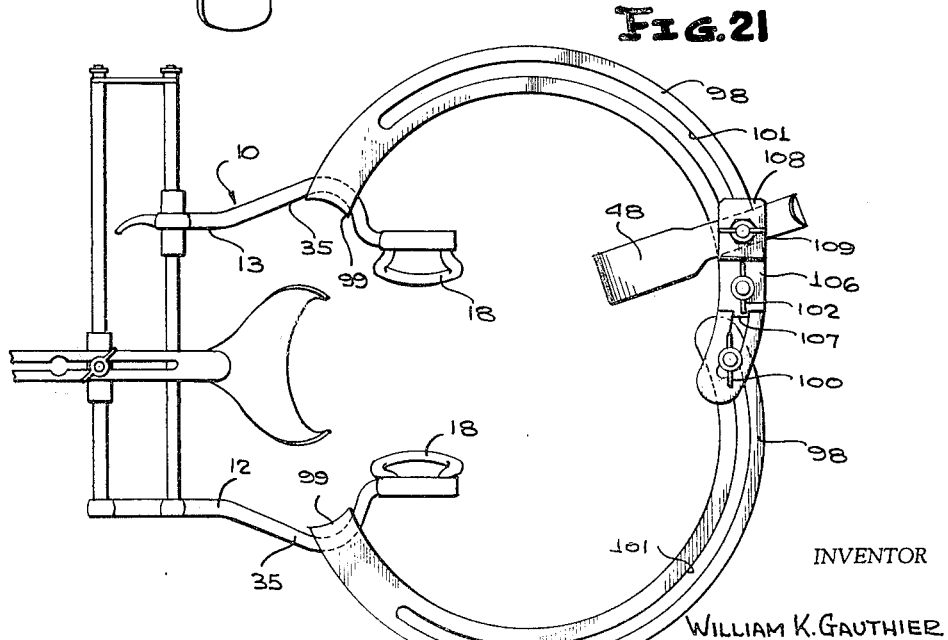

United States Patent Office 3,168,093
Patented Feb. 2, 1965

3,168,093
ABDOMINAL RETRACTOR DEVICE
William K. Gauthier, 310 Codifer Blvd., Metairie, La.
Filed Dec. 22, 1961, Ser. No. 161,634
18 Claims. (Cl. 128—20)

The present invention relates to surgical appliances, and more particularly to an abdominal retractor and attachment means therefor.

It is an object of the present invention to provide an abdominal retractor that may be readily used to produce traction in any particular direction and so that the retractor will properly retain the engaged tissues surrounding an incision during the performance of surgery on a patient.

It is another object of the present invention to provide a retractor attachment that may be readily used with conventional and standard retractors in present day use, such as devices commonly known in the art as Balfours.

It is another object of the present invention to provide a retractor attachment for use with retractor devices commonly used in surgery that may be readily used with a standard retractor blade commonly known as a deaver.

It is another object of the present invention to provide a retractor attachment for well known retractors for properly retaining in a spread-apart position, the portions of the body surrounding an incision to permit surgery to be performed while eliminating the necessity for maintaining access to the incision by having a person manually hold or spread the portion of the incision upon which it is necessary to operate.

It is another object of the present invention to provide novel retractor attachments for use with present day surgical instruments for maintaining an incision open so that the surgeon has access thereto, which devices may be interchangeable with one another and used with well known surgical devices now in use.

It is another object of the present invention to provide a retractor attachment that may be readily attached to and detached from a retractor and which will give an equal or balanced traction force around all portions of the incision.

It is another object of the present invention to provide retractor attachments that may be detachably connected to a retractor at different positions thereon.

It is another object of the present invention to provide a retractor attachment that may be used by itself as a retractor, or in combination with a standard retractor, in this case being used as a retractor attachment.

It is another object of the present invention to provide novel retractor attachments that may be readily adjusted to produce traction in any particular desired direction, and which can be readily adjusted to attain these results around an incision whether the incision be small or large.

It is another object of the present invention to provide novel retractor attachments in which the parts are interchangeable with one another and which are of simple and rigid construction so that they may be quickly used by persons who are relatively unfamiliar with them.

Various other objects and advantages of the present invention will be readily apparent from the following detailed description when considered in connection with the accompanying drawings forming a part thereof, and in which:

FIG. 1 is a top plan view of a retractor attachment embodied in the present invention shown attached to a conventional retractor;

FIG. 2 is a side elevation of the invention taken along lines 2—2 of FIG. 1;

FIG. 3 is a perspective view of the retractor attachment of FIG. 1, illustrating it attached to a standard Balfour device or retractor;

FIG. 4 is an enlarged detailed sectional view taken along lines 4—4 of FIG. 3;

FIG. 5 is an enlarged detailed sectional view of the retractor blade clamp means taken on lines 5—5 of FIG. 4;

FIG. 6 is a sectional detailed view taken along lines 6—6 of FIG. 3, illustrating one means of connecting the retractor attachment to the retractor;

FIG. 7 is a perspective view similar to FIG. 3, illustrating a modification of the retractor attachment of the present invention;

FIG. 8 is a transverse section taken along lines 8—8 of FIG. 7;

FIG. 9 is a perspective view similar to FIG. 7, but illustrating the retractor attachment detachably connected to the Balfours device at a position adjacent its retractor blades;

FIG. 10 is an enlarged detailed section taken along lines 10—10 of FIG. 9;

FIG. 11 is a perspective view of another modification of the retractor attachment of the present invention shown in FIG. 1;

FIG. 12 is a section taken along lines 12—12 of FIG. 11;

FIG. 13 is an exploded detailed view of the modification of FIG. 11, illustrating the manner of connecting portions of the retractor attachment to each other;

FIG. 14 is a perspective view of still another modification of a retractor device of the present invention;

FIG. 15 is an enlarged perspective detailed view of the clamping means for attaching a retractor blade or Devus to the transverse member of the retractor device of FIG. 14;

FIG. 16 is an enlarged perspective detailed view of the clamping means used to attach the transverse member of the retractor device of FIG. 14 to the longitudinal members thereof;

FIG. 17 is a sectional view taken along lines 17—17 of FIG. 14;

FIG. 18 is a sectional view taken along lines 18—18 of FIG. 14;

FIG. 19 is another modification of the retractor device of the present invention;

FIG. 20 is a section taken along lines 20—20 of FIG. 19; and

FIG. 21 is a top plan view illustrating the retractor device of FIG. 19 used in combination with and attached to a standard retractor or Balfours device.

Referring to the drawings, the reference numeral 10 designates a standard metal retractor or Balfours having spaced parallel cross bars or supporting bars 11 preferably of square cross section, with their opposite ends rigidly connected to each other by strut members 9 and having a pair of spaced elongated arms 12 and 13 movable toward and away from each other. Arm 12, as is readily apparent, is formed integral with the bars 11 and is, therefore, fixed, while arm 13 is provided with a sleeve 14 slidably disposed on the inner bar 11 so that the arm 13 may be moved or slid thereon toward and away from arm 12 as desired. The movable arm 13 when moved along the bar 11 will readily slide thereon, whereas when it is disposed in an incision, the outer end 15 thereof which is spaced away from bar 11 will bind sleeve 14 and prevent its movement along bar 11 until a person slides the bar by grasping the handle 16 adjacent sleeve 14.

The outer ends of the longitudinally extending inflexible arms 12 and 13 are provided with retractor blades, hooks or stirrups 18 depending therefrom and extending in a downward and outward direction as best seen in FIG. 3. The retractor members 18 are preferably bifurcated as seen in FIGS. 2 and 3 so as to form a loop at the lower end thereof with the upper ends spaced from each other and secured to the ends 15 of the arms. The retractor blades 18 are properly curved somewhat like a hook so that they will produce traction when inserted in an incision and hold back or retain the portion of the body adjacent thereto such as the tissues and the like.

The outer bar 11 is also provided with a slidable sleeve 20 thereon similar to sleeve 14 to which is connected a longitudinally extending slotted bar 21 having finger grips 22 on the outer end thereof and a retractor blade 23 on the inner end thereof. The bar 21 has an elongated slot 24 therein with spaced enlarged openings 25 therein adapted to receive a wing nut 26 threadably secured to a screw 27 fixed to or secured to sleeve 20. It is readily apparent that the bar 21 may be moved or slid longitudinally of bars 11 so that the retractor blade 23 may be positioned at a predetermined longitudinal distance from bars 11, and it is also apparent that the bar 21 may be pivoted about screw 27 and the outer bar 11 so that the inner end of the bar, and the retractor blade 23 may be positioned at any angle with respect to the bars 11.

When it is desired to fix bar 21 and retractor blade 23 with respect to bars 11, it is merely necessary to tighten up the wing nut 26 on screw 27, at which time the lower portion of the wing nut 26 may be positioned in one of the enlarged openings 25 in slot 24, or the bottom of the nut 26 may engage the top of bar 21 instead of being disposed in an opening 25, as illustrated in FIG. 2.

The face or surface of the retractor blade 23 is relatively wide and when looked at from the top as in FIG. 1, has an arcuate surface 28, whereas when viewed from the side as best seen in FIG. 2, adapted to engage the tissues and portion of the body surrounding the incision, forms a hook 29.

The retractor device 10 is well known in the art and provides a means of spreading apart and retaining the portions of the body adjacent an incision made in the abdomen, to permit surgery on a patient by use of the retractor blades 18 and 23.

In accordance with the present invention and referring to FIGS. 1 to 3, a metal retractor attachment generally designated 30 is provided for use with the retractor 10 and comprises a substantially U-shaped device having generally longitudinally extending, elongated and inflexible flat bars or arms 31 and a transversely extending bar or connector member 32. The bars 31 are substantially identical and are provided with a vertically depending end 33 (see FIG. 3) adjacent the free ends thereof, opposite connector member 32. The vertical ends 33 are provided with a C-shaped opening 34 therein adapted to engage the arms 12 and 13 of the retractor 10. The C openings 34 in the respective arms or face open outwardly and are opposed openings so that each bar may be detachably clipped onto the retractor arms 12 and 13, as shown in FIG. 3 and just as easily removed therefrom when desired.

As shown in FIG. 3, the bars 31 are clipped or clamped onto the arms 12 and 13 adjacent the outwardly angled portion or curved portion 35 in the arms, spaced rearwardly of ends 15. The outer adjacent ends of arms 31 opposite openings 34 are attached to the connecting member 32 through members 36.

Members 36 comprise a hollow elongated sleeve substantially square in cross section, and have their opposite ends 37 and 38 open. The side walls 39 and 40 of the sleeve are provided with aligned slots 41 in the lower portion thereof, which slots are substantially rectangular in cross section and adapted to receive the cross bar or connector member 32 therethrough. The longitudinal arms 31 extend through the hollow sleeves and are disposed in the bottom thereon, while the connecting member 32 is disposed in the sleeve above the arm 31 as best seen in FIG. 4, and of course extends through the slots 41. The arms 31 and the connecting member 32 are rigidly attached or secured to one another by a thumb screw 43 threaded through the top of the sleeve 36 so that the lower end of the thumb screw will engage or bite into the connecting member 32 and thereby rigidly clamp the cross bar 32 to the arm 31 (see FIG. 4). It is readily apparent that the outer ends of the arms 31 away from retractor blades 18 may be readily adjusted or spaced in a predetermined position toward and away from each other by merely sliding the sleeves 36 along connecting member 32 until they are in the desired position, and thereafter tightening the thumb screws 43.

The inner ends of the bars 31 may be readily adjusted or spaced in a predetermined position toward and away from each other by merely adjusting the movable arm 13 toward and away from the fixed arm 12 on the retractor device 10.

An elongated hollow sleeve 45 substantially square in cross section, is slidably disposed on connecting member 32 as shown in FIGS. 3 and 4 and is provided with substantially square cutouts or slots 46 adjacent its ends with a thumb screw 47 extending through the top thereof adjacent each end. The sleeve member 45 is adapted to receive a retractor blade or deaver 48 therethrough which is positioned in the slot 46 and supported on the top of connecting member 32. The retractor blade 48 is rigidly secured in any desired position longitudinally, transversely and angularly of member 32 by properly positioning it as desired and then threading the thumb screw 47 down against the top of the retractor blade to secure it in a fixed position as best illustrated in FIGS. 4 and 5.

Thus with the present invention, it is apparent that the retractor attachment 30 can be readily attached to a standard Balfours device 10, and used in combination therewith to provide a retractor blade adjacent the opposite end of the incision into which the Balfours device is inserted, to provide reliable traction in any particular desired direction and in which the traction around the open incision may be applied in a balanced condition and without causing undue strain on the open wound.

It is also apparent that the member 45 may utilize two retractor blades 48 therein instead of only one, shown for purposes of clarity so that the traction around the incision may be more precisely applied for better results.

Referring to the modification of the invention illustrated in FIGS. 7 to 10, the longitudinal arms 50 are provided with T-shaped clip members 51 secured thereto which are not formed integral therewith but which are separately made and secured thereto by a pin 52 or similar means. The clip 51 is provided with a flat top portion and a vertical portion 53 disposed on the inner edge of arms 50 terminating in a horizontal outwardly extending lip 54 forming the bottom of the clip. The clips 51 are illustrated in FIG. 7 attached to the angular portion 35 of arms 12 and 13.

The connecting or transverse member 55 in this modification is a rod or bar extending through circular aligned openings 56 disposed in the opposite side walls of a hollow square sleeve 57 as shown in FIG. 8. The openings 56 are disposed in the bottom of the sleeve so that the bar 55 is disposed therein below the side arms 50. A thumb screw 58 extends through the top of the sleeve 57 and may be tightened against the arms 50 to secure the arms 50 to the bar 55 so that the arms 50, after being adjusted or spaced with respect to one another, may be rigidly secured in the desired position.

A retractor blade member 48 may be fixed to bar 55 after it is adjusted in the desired position by clamping means consisting of a U-shaped member 60 having aligned slots 61 disposed in the lower portion of the vertical legs 62 of member 60. The outer end of the retractor blade 48 extends through the U-shaped member 60 and over bar 55 as best seen in FIGS. 7 and 8. Thereafter, a thumb nut 63 extending through the horizontal leg or top 64 of the U-shaped member is tightened until the lower end thereof engages blade 48 and fixedly or rigidly secures it in position with respect to bar 55.

Referring to FIGS. 9 and 10, it will be noted that the clip members 51 may be disposed on the outer end 15 of the arms 12 and 13 with the vertical leg 53 and lip 54 extending between the bifurcated portions or rods of the retractor blade or hook 18, instead of being attached to the angled portion 35 of the arms 12 and 13, as in FIG. 7.

Referring to the modification of the invention illustrated in FIGS. 11 to 13, the longitudinal arms 70 are provided with elongated slots 71 extending substantially the full length thereof, while the transverse connecting member 72 is also provided with a similar elongated slot 73. The inner ends of the arms 70 are provided with a U-shaped outwardly facing clip 75 secured thereto in any well known manner, with the lower legs 76 of the clip 75 clipped onto the outer end 15 of the arms 12 and 13 of the Balfours device adjacent the retractor blades 18.

The longitudinal arms 70 are detachably connected to the transverse or cross arm 72 by a U-shaped channel member 76 (see FIGS. 12 and 13) and a threaded screw member 77 and wing nut 78. The channel member 76 has the arm 70 extending therethrough and disposed therein with the transverse connecting member 72 disposed on the arm 70 and the threaded bolt 77 extending through a centrally disposed aperture in channel 76, slot 71 and slot 73 of cross member 72. The arms 70 and the transverse connecting member 72 are rigidly secured to one another by merely tightening the wing nut until the parts rigidly engage one another. The bolt member 77 may, if desired, be rigidly secured to the channel member 76.

The slotted cross member or connecting member 72 is provided with a U-shaped clamping member 79 having spaced vertical legs 80, with horizontal legs 81 on the bottom thereof adapted to engage the bottom of member 72. The retractor blade 48 is disposed on top of member 72 and extends through the space 81' between the vertical legs 80. A thumb screw 82 is threaded into the top of 79 adjacent space 81 so that it wlil engage the top of the retractor device 48 as best illustrated in FIGS. 11 and 12 to rigidly secure the blade 48 in the desired position.

Referring to the modification of the invention shown in FIGS. 14 to 18, the longitudinal arms 83 are provided with integral retractor blades 84 depending therefrom adjacent one end thereof, and have the other end connected to the transverse connecting member 85. This device may be used by itself as a retractor without connecting it to the Balfour device. The retractor blades 84 are curved from above down with the convex surfaces opposing each other, their plane being in the same plane as the length of the longitudinal members 83. The blades 84 when applied will be parallel to each other and also the cut edges of the wound so that the device will produce retraction and traction when inserted in an incision. The sleeve members 86 in this embodiment are made of thin gauge material having a thickness no greater than standard sheet metal. The sleeves 86 are provided with aligned rectangular slots 87 in the opposite side walls thereof, through which the connecting member 85 extends. The bottom 88 of the sleeve member 86 is split so that a slot or opening 89 extends completely therethrough. The sleeve 86 has longitudial arms 83 extending therethrough with the connecting member 85 extending through slots 87 and disposed on top of the arms 83. A nut 90 is fixedly secured to the underside of the top wall 91 of the sleeve so as to provide threads for a thumb screw 92 which extends through an opening in the top wall 91 and is threaded into and through the metal or nut 90 so that the lower end thereof bears against and engages the connecting member 85 to properly secure and fix the arms 83 with respect to the transverse member 85.

A sleeve member 93 is provided on member 85 for connecting the retractor blade 48 to the connecting member 85. The sleeve 93 is substantially square in cross section and is provided with aligned slots 94 adjacent one end 96 thereof. The retractor blade 48 extends through slots 94 and is disposed on top of member 85. A thumb screw 97 is provided which extends through the top of the sleeve so that it may be tightened to rigidly fix the member 85 and the retractor blade 48 to each other.

Referring to the embodiment of the invention shown in FIGS. 19 to 21, this retractor attachment may be used by itself as a retractor, together with a retractor blade for insertion in an incision to maintain traction, or it may be used in combination with the standard Balfours device 10.

This embodiment of the invention comprises two flat semi-circular shaped or curved arms 98 having retractor blades 99 formed integrally therewith, adjacent their free ends. The arms 98 are pivotally connected to one another through a wing nut and bolt 100 threaded through elongated slots 101 in arms 98.

The slotted left arm 98 has a wing nut 102 threadably engaging a bolt 103 extending through slot 101 and secured to a sheet metal member 104 positioned underneath the arm 98. The member 104 has an upstanding tongue portion 105 adapted to extend through slot 101 to keep member 104 from turning with respect to left arm 98, but permitting it to be moved longitudinally of slot 101. A sheet metal member 106 is disposed over arm 98 with a depending tongue 107 which extends through the slot 101 adjacent the tongue 105 of member 104 to prevent turning of member 106 with respect to left arm 98, but permitting it to be slid or moved in the slot from one end to the other. The threaded bolt 103 extends through member 106, and the wing nut 102 may be loosened to move the member 106 along the slot to position it at any desired point therein. An offset portion 108 of member 106 has a thumb nut 109 extending therethrough and through a threaded nut 110 fixedly secured atop portion 108. The wing nut 109 is adapted to rigidly secure the retractor blade 48 between the upper side of left arm 98 and the nut. Thus, it is readily apparent that this embodiment of the invention provides means for pivotally adjusting the arms 98 with respect to one another and thereafter rigidly fixing them with respect to each other, and further provides means for properly positioning and adjusting a retractor blade 48 thereon, and then rigidly securing it to the slotted left arm 98 so that this device may be used by itself in performing traction on an incision when inserted therein, if desired.

Referring to FIG. 21, it is also apparent that this modification of the retractor attachment may be combined with the Balfour device 10 and used therewith by clipping or attaching the retractor blades 98 to the curved portion or angled portion 35 of the Balfours, and along with the Balfours both devices may be utilized in properly spreading apart and holding an incision to give the surgeon access thereto.

Thus, it will be apparent from the foregoing description that the applicant has provided novel retractor attachment devices that may be readily adjusted into predetermined positions and thereafter rigidly or immovably fixed with respect to one another so that they may be used in performing surgery.

It is also apparent that the invention provides a number of retractor attachments that may be interchangeably used with each other, and some of which may be used by themselves, or in combination with a standard Balfours or retractor device for the desired objects set forth hereinbefore.

Inasmuch as various changes may be made in the form, location and relative arrangement of the several parts without departing from the essential characteristics of the invention, it will be understood that the invention is not to be limited except by the scope of the appended claims.

I claim:

1. In combination, a retractor device including a cross member and spaced parallel arms connected to said cross member and extending outwardly substantially at a right angle with respect thereto, means for moving said parallel arms toward and away from each other, opposed retractor members disposed on adjacent ends of said arms and projecting in one direction from a plane defined by said arms, and another retractor member disposed on said cross member and projecting in said one direction, a retractor attachment detachably connected to said retractor device comprising spaced inflexible arms, a connecting member disposed between said inflexible arms, means for moving said inflexible arms toward and away from each other a predetermined distance, means for detachably connecting said inflexible arms to said connecting member, a retractor member detachably connected to said connecting member and projecting in said one direction, and means for moving said retractor member on said connecting member longitudinally, transversely and angularly with respect to said connecting member.

2. The combination of claim 1 wherein said inflexible arms and said connecting member are substantially U-shaped when connected to each other.

3. The combination of claim 1 wherein said means for moving said inflexible arms includes a hollow sleeve member slidably disposed on said connecting member and on one of said inflexible arms.

4. The combination of claim 1 wherein said means for moving said inflexible arms comprises a channel member and bolt member secured to said channel member.

5. The combination of claim 1 wherein said inflexible arms and connecting member comprise flat members having elongated slots therein and said means for detachably connecting said inflexible arms to said connecting member comprises threaded means extending through said slots.

6. The combination of claim 1 wherein said inflexible arms are longitudinally extending flat members rectangular in cross section, and said connecting member extends transversely between said inflexible arms.

7. The combination of claim 1 wherein said retractor attachment is provided with inwardly facing hook means disposed on said inflexible arms opposite said connecting member for connecting the attachment to said retractor device parallel arms.

8. The combination of claim 1 wherein said inflexible arms are longitudinally extending flat members rectangular in cross section and said connecting member is a transversely extending rod.

9. The combination of claim 1 wherein said retractor attachment is provided with depending means for clipping said attachment to said retractor device parallel arms.

10. The combination of claim 1 wherein said retractor attachment is detachably connected to said retractor device adjacent said opposed retractor members.

11. The combination of claim 1 wherein said retractor attachment is detachably connected to said retractor device parallel arms and in spaced longitudinal relationship with said opposed retractor members.

12. A retractor attachment for use with a retractor, comprising two parallel longitudinal inflexible spaced arms, a depending T-shaped clip member having a horizontal lip secured to the adjacent ends of said spaced retractor arms for attaching them to the retractor, a transverse rod extending between said inflexible arms, a pair of hollow sleeve members, each of said inflexible arms slidably extending through one of said respective sleeve members, said sleeves having aligned apertures in their side walls, said rod slidably extending through said apertures so said inflexible arms and rod are substantially U-shaped and adjustable, screw means connected to each sleeve for rigidly clamping said inflexible arm and rod passing through a respective sleeve to each other to secure said inflexible arms a predetermined distance from each other, a U-shaped member having aligned slots slidably disposed on said rod, said rod extending through said slots, a retractor blade extending through said U-shaped member and over said rod, and a screw connected to said U-shaped member and clamping said retractor blade on said rod at a predetermined position thereon.

13. A retractor attachment for use with a retractor comprising two parallel longitudinal inflexible arms having elongated slots therein, hook means on adjacent ends of said inflexible arms for detachably connecting them to a retractor, a transverse member extending between said arms having an elongated slot therein, channel members having a threaded bolt and nut connected thereto disposed on adjacent ends of said arms, said arms being disposed in said channel members with said bolts extending through the slots of said arms, said transverse member being disposed on said arms with the bolts of said channel members extending through the slot of said transverse member, said nuts being disposed on said bolts to rigidly secure said transverse member and arms to each other at a predetermined position, and a retractor blade detachably connected to said transverse member.

14. The retractor attachment of claim 13 wherein said retractor blade is detachably connected to said transverse member by a clamping member having spaced vertical legs with horizontal legs extending from the bottom of said vertical legs adapted to engage said transverse member, and a threaded member is disposed on said clamping member to engage said retractor blade and hold it against said transverse member.

15. The retractor attachment of claim 13 wherein said hook means comprises inwardly facing U-shaped clips.

16. A retractor comprising two parallel longitudinal arms, a depending integral retractor blade disposed on adjacent ends of said arms, a transverse member extending between said arms, a pair of hollow sleeve members, each of said arms slidably extending through one of the respective sleeve members, said sleeve members having aligned slots in their side walls, said transverse member slidably extending through said slots so said arms and transverse member are substantially U-shaped, screw means connected to each sleeve member for rigidly clamping said arm passing through a respective sleeve member and the transverse member to each other to secure said arms a predetermined distance from each other, another sleeve member slidably disposed on said transverse member, another retractor blade extending through said another sleeve member, and clamp means for said another sleeve member for fixedly securing said another sleeve member and said another retractor blade to said transverse member at a predetermined position.

17. The retractor of claim 15 wherein said another sleeve member is substantially square in cross section and has aligned slots adjacent one end thereof for passing said another retractor blade therethrough.

18. A surgical retractor comprising a U-shaped body having a pair of spaced legs connected by a bight member, a pair of hollow sleeves each having a pair of crisscrossing passages therethrough, one end of each leg slidably extending through one of said passages in each sleeve, opposite ends of said bight member slidably extending through the other passage in each of said sleeves, releasable means on each sleeve urging it into locking engagement with one of said legs and said bight member, the other end of each of the legs having means thereat for detachably connecting the said other ends to spaced rigid arms of another retractor, a retractor blade connected to said bight member and extending away from a plane defined by said legs.

References Cited in the file of this patent

UNITED STATES PATENTS

| | | |
|---|---|---|
| 1,707,689 | Sloan | Apr. 2, 1929 |
| 1,919,120 | O'Connor et al. | July 18, 1933 |
| 1,963,173 | Morin | June 19, 1934 |
| 2,473,266 | Wexler | June 14, 1949 |
| 2,541,516 | Ivory et al. | Feb. 13, 1951 |
| 2,642,862 | Jackson | June 23, 1953 |
| 2,670,731 | Zoll et al. | Mar. 2, 1954 |
| 2,693,795 | Grieshaber | Nov. 9, 1954 |
| 2,812,759 | Taylor | Nov. 12, 1957 |
| 2,850,008 | Resch | Sept. 2, 1958 |

OTHER REFERENCES

Mueller & Co., catalog of 1938, page 301, FIGS. GU–1918 and GU–1922, and page 371, FIG. GO–784.